United States Patent [19]

Holmes

[11] 4,208,456
[45] Jun. 17, 1980

[54] REPAIR OF FRP PARTS

[75] Inventor: Richard G. Holmes, Wadsworth, Ohio

[73] Assignee: The General Tire & Rubber Company, Akron, Ohio

[21] Appl. No.: 18,482

[22] Filed: Mar. 8, 1979

[51] Int. Cl.$^2$ .......................... B32B 3/26; B32B 7/12; B32B 31/12; B32B 31/20
[52] U.S. Cl. ........................................ 428/63; 156/94; 264/36
[58] Field of Search ..................... 156/94, 95, 97, 135; 264/36; 428/63; 29/401 A, 401 D, 401 E

[56] References Cited

U.S. PATENT DOCUMENTS

| | | | |
|---|---|---|---|
| 1,475,029 | 11/1923 | Risk | 156/94 |
| 2,370,958 | 3/1945 | Hellier | 156/95 X |
| 4,093,481 | 6/1978 | Schelkmann | 156/95 |
| 4,148,122 | 4/1979 | Phillips et al. | 156/94 X |

OTHER PUBLICATIONS

"Patching A Roof Before Coating", The Washington Post, Nov. 4, 1972, p. E10.

*Primary Examiner*—William A. Powell
*Assistant Examiner*—Robert A. Dawson

[57] ABSTRACT

Blisters on cured molded thermoset fiberglass reinforced plastic (FRP) parts are repaired by injecting an anaerobic sealant into the blister, pressing the filled blister to reduce the blister to the preblister form while eliminating excess sealant, and heating to cure and set the sealant to hold the blister in its reduced form.

6 Claims, No Drawings

REPAIR OF FRP PARTS

This invention relates to the repair of molded thermoset fiberglass reinforced plastic (FRP) or polyester parts such as those which may be used on vehicles like automobiles, trucks, and so forth.

BACKGROUND OF THE INVENTION

Blisters sometimes occur during the production of automobile Class "A" molded fiberglass reinforced plastic, e.g., polyester, FRP, parts requiring removal of the blister, filling the hole or void left by the blister with automobile putty, sanding and other refinishing operations which are expensive in time, materials and labor. These blisters may be due to improper mixing or curing of the components, layering of the glass and/or pockets of unpolymerized gaseous or liquid monomer such as styrene which causes expansion or rising of the skin of the molding due to gas expansion and so forth. Blisters may range in size from about ¼ to 4 to 5 inches in diameter, and the subsequent venting associated with blisters may cause skin rupture. This problem becomes even more severe if the FRP part is mounted on the automobile chassis and passes through the paint tunnels and drying ovens. Here, the solvent has penetrated into a crack or been absorbed into the outer layers possibly due to porosity of the FRP part and on heating causes expansion and formation of a blister requiring the automobile to be removed from the assembly line, the parts removed, reworked as above, repainted and remounted on the chassis, sometimes taking up to four hours. In some cases the entire automobile must be recycled through the painting tunnels and ovens. Moreover, many of the available repair methods do not hold in subsequent operations and may cause severe surface damage or textural change which is evident after painting.

Accordingly, it is an object of the invention to avoid the difficulties alluded to above and to provide an improved method for repairing blisters on FRP parts. Another object is to provide an improved repaired fiberglass reinforced plastic part. These and other objects and advantages of the present invention will become more apparent to those skilled in the art from the following detailed description.

STATEMENT OF THE INVENTION

According to the present invention the blisters on molded thermoset FRP parts may readily be repaired by drilling a hole in the blister, injecting an anaerobic adhesive or sealant into the blister or void area to at least substantially, preferably entirely, fill the blister. An inert covering material and forming means then are placed over the blister, pressure is applied to reduce or eliminate the blister and eliminate excess sealant and heat is applied to cure the sealant to itself and the skin area to the adjacent area or part of the molding. Excess anaerobic sealant on the surface can readily be removed since it does not cure when exposed to the atmosphere. This method of repairing an FRP part or laminate provides a repaired part without significant surface destruction or textural change. If unpainted, the part may then readily be primed and/or sealed and painted. Moreover, this method of repair means that the part can be easily repaired on the car without the need to disassemble and reassemble parts. The part after repair needs only to be sanded and repainted.

DISCUSSION OF DETAILS AND PREFERRED EMBODIMENTS

FRP (fiberglass reinforced plastic, such as polyester) thermoset moldings are well known. They may be produced from compositions of fiberglass containing an unsaturated polyester, unsaturated monomer for crosslinking like styrene, catalyst and other well known compounding ingredients and cured in a mold under heat and pressure to form a thermoset article.

An example of a composition for making an FRP part is shown as follows:

| Ingredient | Parts by Weight |
| --- | --- |
| "Paraplex" P340 | 4,000 |
| "Paraplex" P681 | 2,240 |
| "Paraplex" P543 | 772 |
| "Camel-Wite" | 10,520 |
| TBP | 70 |
| Zinc stearate | 350 |
| $Mg(OH)_2$ | 316 |
| Glass fibers | 7,830 |

Notes:

"Paraplex" P 340—A 65% by weight solution of polyester in styrene, the polyester being essentially a polypropylene fumarate, OH No. of 35, COOH No. of 35, average molecular weight of about 1,600. Rohm & Haas Company.

"Paraplex" P 681—35% by weight solution of polymethylmethacrylate containing some carboxyl groups in styrene. Rohm & Hass Company.

"Paraplex" P 543—35% by weight solution of polymethyl methacrylate in styrene. Rohm & Haas Company.

"Camel-Wite"—Calcium carbonate (limestone), average particle size of 3.3 microns, Campbell Grove Division of H. M. Royal.

TBP—Tertiary butyl perbenzoate.

Where the cured part has a blister, a small hole or opening is drilled at one side of the blister, preferably in the center of the blister, and another hole is drilled in the blister at a distance from the first hole to permit escape of gases and later of excess sealant. The holes should be small, e.g., just large enough for an injector. Also, the hole should be drilled through the blister or raised (skin) portion or surface of the laminate, and the drilling is terminated when the drill or other device breaks into the voided section caused by the blister. The drill is then removed from the hole(s).

A quantity of a heat curable catalyzed anaerobic sealant is then placed in an injector, such as a hypodermic syringe and needle, and the injector is inserted into at least one of the holes. A preferred anaerobic sealant is "Loctite" 290 (Loctite Corporation) comprising about 94% dimethacrylate esters, 0.8% alkyl arylamine, 1.6% sulfimide, 3% catalyst and 0.6% methanol and which exhibits low surface tension.

The anaerobic sealant is then injected into the void to fill it or fill it as much as possible. A layer of protective or inert film of "Mylar" (duPont, a polyester, polyethylene terephthalate) or other inert film then is placed over the filled blister or void, and a surface conforming device (either metal, wood, sand or shot bag, FRP, epoxy, ceramic or other shaping device) is applied under sufficient pressure against the surface of the film to reduce the surface to the preblistered form, e.g., to press the raised portion or skin of the blister back in place adjacent the substrate of the molding. During the pressing step any excess sealant will be forced out of the injector hole(s), will not adhere to the conforming device due to the layer of the protective film and can readily be removed by wiping since the anaerobic sealant does not cure or set up in the presence of oxygen (in the air). Of course instead of using a separate inert film the body contacting area of the pressure surface conforming device can contain an inert film or layer of "Mylar," "Teflon," or other heat resistant inert material, e.g., one that will not decompose at operating pressures or temperatures or be attacked by or stuck to the FRP part of sealant. After the raised surface has thus been substantially reduced or eliminated and held in place by a surface conforming device such as a clamp, jack, weight or other pressure means, heat for curing is applied by any number of methods including heat guns, heated clamps and so forth. One method, prior to applying, the pressure device is to apply an electric heating pad or band to the part to be cured and then apply the pressure means. After sufficient time and temperature to properly cure the sealant for example, about 10 minutes at 300° F. (148.9° C.), but other times and temperatures can be used depending on the particular sealant and part and so forth, has occurred to effect a cure of the sealant and to adhere the reduced blister or its skin to the bulk of the FRP part, the heat and pressure are removed. The cured sealant holds the blister in its reduced state, and there is no evidence of its preexistence after subsequent finishing operations. This procedure can be performed on FRP parts mounted on car bodies in assembly plants and blistered during some of the bake cycle. The drilled hole fills up with excess sealant, processed as described above, and after cure is sanded and finished as an original part.

Anaerobic adhesives or sealants are well known. Anaerobic sealants are those whose curing reactions are prevented by oxygen (from the air, for example), and when oxygen is excluded, they will cure. These sealants are generally acrylates, substituted acrylates, siloxane containing acrylates and others cured by means of peroxide catalysts or initiators, possibly using accelerators such as sulfimides and amines etc. While they may cure at room temperature, it is preferred to heat the material to speed curing. Please see the "Handbook of Adhesive Bonding," Cagle, McGraw-Hill Book Company, New York, 1973. Anaerobic sealant compositions, also, are shown in the following U.S. Pat. Nos. 3,855,040; 3,880,956; 3,890,273; 3,957,561; 3,970,505; 3,980,627; 3,984,385; 3,985,943; 3,987,019; 3,987,234; 3,988,507; 3,991,261; 4,005,055; 4,007,322; 4,007,323; 4,035,355; 4,038,475; 4,055,542; 4,056,670 and 4,069,378.

I claim:

1. A method for repairing a blister in a molded cured thermoset fiberglass reinforced plastic article comprising
   a. forming small holes in the blister leading into the void defined by the blister,
   b. injecting a heat curable catalyzed anaerobic sealant through at least one of said holes of said blister into said void to at least substantially fill said void with said sealant,
   c. applying pressure to the filled blister to at least substantially reduce the size of the blister to at least substantially conform to the original designed shape of said article while eliminating any excess amount of said sealant ejected from said void of said blister during said pressing and
   d. applying heat at a temperature and for a period of time sufficient to cure said sealant and to adhere the blister in its reduced form to the adjacent substrate of said article.

2. A method according to claim 1 containing the additional steps of disposing on the sealant filled void of said blister after step b. a protective layer of an inert film.

3. A method according to claim 2 where said plastic is a polyester and said sealant comprises about 94% dimethacrylate esters.

4. The product produced by method of claim 1.

5. The product produced by the method of claim 2.

6. The product produced by the method of claim 3.

* * * * *